US009094090B2

(12) United States Patent
Markovitz et al.

(10) Patent No.: US 9,094,090 B2
(45) Date of Patent: Jul. 28, 2015

(54) DECENTRALIZED CACHING SYSTEM

(75) Inventors: Oren Markovitz, Raanana (IL); Yoseph Hecht, Rehovot (IL); Nitay Argov, Tel-Mond (IL); Zohar Kanfi, Tel-Aviv (IL)

(73) Assignee: Gilat Satellite Networks Ltd., Petah Tikva (IL)

( * ) Notice: Subject to any disclaimer, the term of this patent is extended or adjusted under 35 U.S.C. 154(b) by 450 days.

(21) Appl. No.: 13/409,705

(22) Filed: Mar. 1, 2012

(65) Prior Publication Data
US 2013/0080701 A1 Mar. 28, 2013

Related U.S. Application Data

(60) Provisional application No. 61/538,177, filed on Sep. 23, 2011.

(51) Int. Cl.
*G06F 12/08* (2006.01)
*H04B 7/185* (2006.01)
*G06F 9/38* (2006.01)

(52) U.S. Cl.
CPC ........ *H04B 7/18517* (2013.01); *G06F 12/0862* (2013.01); *G06F 9/383* (2013.01); *G06F 12/0866* (2013.01)
USPC .................... 711/137; 711/115; 711/E12.017

(58) Field of Classification Search
USPC ................................... 711/137, 115, E12.017
See application file for complete search history.

(56) References Cited

U.S. PATENT DOCUMENTS

| | | | |
|---|---|---|---|
| 5,673,322 A | 9/1997 | Pepe et al. | |
| 5,706,507 A | 1/1998 | Schloss | |
| 5,715,445 A | 2/1998 | Wolfe | |
| 5,727,129 A | 3/1998 | Barrett et al. | |
| 5,754,774 A | 5/1998 | Bittinger et al. | |
| 5,761,683 A | 6/1998 | Logan et al. | |
| 5,812,545 A | 9/1998 | Liebowitz et al. | |

(Continued)

FOREIGN PATENT DOCUMENTS

| EP | 0788246 A2 | 8/1997 |
|---|---|---|
| JP | 55-120249 | 9/1980 |

(Continued)

OTHER PUBLICATIONS

Gilat Sky Edge II Spec Sheet, Mar. 14, 2011, satnews.com [online]. http://www.satnews.com/cgi-bln/story.cgi?number=1867514587 [retrieved on Sep. 25, 2012]. Retrieved from: http://www.gilatnetworks.com/data/uploads/Management/SEII_WE.pdf.

(Continued)

*Primary Examiner* — Yong Choe
(74) *Attorney, Agent, or Firm* — Banner & Witcoff, Ltd.

(57) ABSTRACT

In a satellite communication system comprising at least a hub and a plurality of terminals, at least one terminal may include a cache for storing data objects. The cache may be based on a detachable memory device that may be inserted to or removed from the terminal at any given time, including after the terminal is deployed. Aspects are directed to preventing a prefetching of objects already stored in a cache of a remote terminal. In some embodiments, an efficient multicasting of content to terminals over an adaptive link may occur in a manner which may benefit terminals comprising a cache while not affecting or minimally affecting the performance of terminals that may not include a cache.

20 Claims, 5 Drawing Sheets

(56) References Cited

U.S. PATENT DOCUMENTS

| | | | |
|---|---|---|---|
| 5,825,890 A | 10/1998 | Elgamal et al. | |
| 5,852,717 A | 12/1998 | Bhide et al. | |
| 5,925,100 A | 7/1999 | Drewry et al. | |
| 5,929,850 A | 7/1999 | Broadwin et al. | |
| 5,987,233 A | 11/1999 | Humphrey | |
| 5,991,306 A | 11/1999 | Burns et al. | |
| 5,995,725 A | 11/1999 | Dillon | |
| 6,003,087 A | 12/1999 | Housel, III et al. | |
| 6,016,388 A | 1/2000 | Dillon | |
| 6,023,605 A | 2/2000 | Sasaki et al. | |
| 6,038,594 A | 3/2000 | Puente et al. | |
| 6,078,810 A | 6/2000 | Olds et al. | |
| 6,081,900 A | 6/2000 | Subramaniam et al. | |
| 6,085,193 A | 7/2000 | Malkin et al. | |
| 6,115,384 A | 9/2000 | Parzych | |
| 6,115,750 A | 9/2000 | Dillon et al. | |
| 6,161,141 A | 12/2000 | Dillon | |
| 6,167,438 A | 12/2000 | Yates et al. | |
| 6,182,122 B1 | 1/2001 | Berstis | |
| 6,205,473 B1 | 3/2001 | Thomasson et al. | |
| 6,272,598 B1 | 8/2001 | Arlitt et al. | |
| 6,282,542 B1 | 8/2001 | Carneal et al. | |
| 6,321,268 B1 | 11/2001 | Dillon et al. | |
| 6,338,131 B1 | 1/2002 | Dillon | |
| 6,366,947 B1 | 4/2002 | Kavner | |
| 6,427,172 B1 | 7/2002 | Thacker et al. | |
| 6,449,658 B1 | 9/2002 | Lafe et al. | |
| 6,598,048 B2 | 7/2003 | Carneal et al. | |
| 6,654,344 B1 | 11/2003 | Toporek et al. | |
| 6,658,463 B1 | 12/2003 | Dillon et al. | |
| 6,711,679 B1 | 3/2004 | Guski et al. | |
| 6,742,043 B1 | 5/2004 | Moussa et al. | |
| 6,907,429 B2 | 6/2005 | Carneal et al. | |
| 6,959,318 B1 | 10/2005 | Tso | |
| 7,007,062 B1 | 2/2006 | Serenyi et al. | |
| 7,130,908 B1 | 10/2006 | Pecus et al. | |
| 7,558,837 B1 | 7/2009 | Denny | |
| 2002/0007374 A1 | 1/2002 | Marks et al. | |
| 2002/0016911 A1 | 2/2002 | Chawla et al. | |
| 2002/0055966 A1 | 5/2002 | Border et al. | |
| 2002/0129116 A1* | 9/2002 | Humphrey | 709/217 |
| 2002/0133596 A1 | 9/2002 | Border et al. | |
| 2003/0112772 A1 | 6/2003 | Chatterjee et al. | |
| 2004/0093419 A1 | 5/2004 | Weihl et al. | |
| 2008/0068787 A1 | 3/2008 | Okada | |
| 2010/0070570 A1* | 3/2010 | Lepeska | 709/203 |
| 2010/0325670 A1 | 12/2010 | Strong et al. | |
| 2011/0194858 A1 | 8/2011 | Rotenstein et al. | |

FOREIGN PATENT DOCUMENTS

| | | |
|---|---|---|
| JP | 59-135948 | 8/1984 |
| JP | 60-167533 | 8/1985 |
| JP | 62-189823 | 8/1987 |
| JP | 63-194426 | 8/1988 |
| JP | 4-306934 | 10/1992 |
| JP | 5-157565 | 6/1993 |
| JP | 5-252085 | 9/1993 |
| JP | 5-252087 | 9/1993 |
| JP | 5-252165 | 9/1993 |
| JP | 6-170823 | 6/1994 |
| JP | 6-252896 | 9/1994 |
| JP | 9-508228 | 8/1997 |
| WO | 9905584 A2 | 2/1999 |
| WO | 9908429 A1 | 2/1999 |
| WO | 9916201 A2 | 4/1999 |
| WO | 0042519 A1 | 7/2000 |
| WO | 01/61886 A2 | 8/2001 |

OTHER PUBLICATIONS

Gliat WebEnhance Q&A, Apr. 2011, gilatnetworks.com [online]. http://www.gilatnetworks.com/Content.aspx?Page=WebEnhance [retrieved on Sep. 25, 2012]. Retrieved from: http://www.gilatnetworks.com/data/uploads/ProductPDFs/WebEnhance_QA_2011-04.pdf.

Gliat CacheMode Technology White Paper, Apr. 2011, gilatnetworks.com [online]. http://www.gilatnetworks.com/Content.aspx?Page=WebEnhance [retrieved on Sep. 25, 2012]. Retrieved from: http://www.gilatnetworks.com/data/uploads/ProductPDFs/CacheMode_WhIte_Paper_2011-04.pdf.

International Search Report—PCT/IB12/00390—Mailing Date: Oct. 26, 2012.

Introducing WebEnhance, Gilat presentation—2011.

Gilat launches industry first VSAT with MicroSD Multi-Giga Byte Cache memory, Mar. 14, 2011.

SkyEdge II WebEnhance, Gilat Satellite Networks Ltd, 2011, retrieved from http://www.gilatnetworks.com/Content.aspx?Page=WebEnhance on Feb. 10, 2012.

Stadler et al. "Performance Enhancement for TCP/IP on a Satellite Channel". IEEE. 1998. pp. 270-276.

Wessels, Duane. "Web Caching" O'Reilly & Associates, 2001. pp. 1-292.

Zheng Wang and Jon Crowcroft, Department of Computer Science, Prefetching in World Wide Web, Communications: The Key to Global Prosperity. Globecom 1996 Internet 96 Conference Record, London, dated Nov. 18, 1996, pp. 28-32. (Abstract).

H. Shrikumar and Rehmi Post, Physics and Computer Science, Thinternet: Life at the End of a Tether, Computer Networks and ISDN Systems, vol. 27, No. 3. (Dec. 1994). pp. 375-385.

Ari Luotonen (1998) Web proxy servers. Netscape Communications Corporation. Cover pp. 170-171.

Office Action in European Patent Application No. 10157847.4-1246, dated Aug. 30, 2011.

Search Report in European Patent Application No. 10157847, dated Apr. 22, 2010.

European Search Report for Application No. 07075087.2 dated Dec. 19, 2007, 7 pages.

Hua Chen, Marc Abrams, Anup Mathur, Ibraz Anwar and John Stevenson, "Wormhole Caching with HTTP PUSH Method for a Satellite-Based Web Content Multicast and Replication System", Mar. 1999, pp. 1-12, XP002201410.

NetGuard Unveils Guardian Internet Firewall for Windows NT and OS/2 Warp, Dialog File 649: Gale Newswire ASAP 2003 © The Gale Group, Apr. 30, 1996; pp. 1-4.

"Lanoptics Netguard: Netguard ships Guardian version 2.0; Enhanced Firewall product provides unique real time internet management functionality and customizable report information", Dialog ® File 810:Business Wire © 1999 Business Wire, Oct. 16, 1996, pp. 1-4.

"Internet World Exhibitors: Fall Internet World '96 Exhibitor Previews—Part Three of Five", Dialog ® File 810:Business Wire © 1999 Business Wire, Dec. 3, 1996, pp. 1-11.

Kosuke et al, "Communication Systems Using Line in Common", Patent Abstracts of Japan, Section E, Section No. 579, vol. 12, No. 35, Feb. 2, 1988, p. 120.

Fumitoshi, "Silicon Single-Crystal Substrate", Patent Abstracts of Japan, Section: E, Section No. 1193, vol. 16, No. 166, Apr. 22, 1992, p. 149.

Nobuyuki et al., "Satellite Communication System", Patent Abstracts of Japan, Section: E, Section No. 429, vol. 10, No. 240, Aug. 19, 1986, p. 32.

Katsuhiro et al., "Satellite Communication Equipment", Patent Abstracts of Japan, Section: E, Section No. 1487, vol. 18, No. 10, Jan. 10, 1994, p. 101.

Kazutomo, "Satellite Packet Communication Method", Patent Abstracts of Japan, Section E, Section No. 660, vol. 12, No. 351, Sep. 10, 1988, p. 25.

Brooks et al., "Application-Specific Proxy Servers as HTTP Stream Transducers", http://www.w3.org/conferences/WWW4/papers/56/, Apr. 30, 2003, pp. 1-11.

Zelinka, "Guardian offers a sophisticated, PC-based firewall", INFOWORLD, http://www.inforworld.com, Jul. 29, 1996, p. 1.

Wang et al., "Prefetching in World Wide Web", Department of Computer Science, University College London, 1995, pp. 1-12.

Shrikumar, "Thinternet: Life at the End of a Tether", Thinternet—Life on a Tether Proc. INET '94/JENC5 H. Shrikumar, pp. 1-14.

Johner et al. LDAP Implementation Cookbook. IBM Redbooks. Jun. 5, 1999. pp. 1-6.

(56) References Cited

OTHER PUBLICATIONS

European Search Report for EP Application 12150756, dated May 23, 2012.
Chawla, Rajeev and Boneh, Dan. U.S. Appl. No. 60/223,171. "Apparatus and Method for Caching Secure Web Content", filed Aug. 7, 2000. pp. 1-7.
International Preliminary Report on Patentability—PCT/IB2012/000390—Date of issuance: Mar. 25, 2014.
"WWW Collector—The Prefetching Proxy Service for WWW", Wcol: WWW Collector, p. 1, http://www.jaist.ac.jp/~k-chinen/pg/wcol/, last visited Oct. 9, 2014.
European Search Report—EP Application 12833975.1—dated May 4, 2015.

\* cited by examiner

DECENTRALIZED CACHING SYSTEM

CROSS REFERENCE TO RELATED APPLICATIONS

The present application claims priority to U.S. Provisional Application No. 61/538,177, filed Sep. 23, 2011 and entitled "Decentralized Caching System," the entire contents of which are hereby incorporated by reference.

FIELD

Aspects of this disclosure pertain, in general, to the field of data traffic acceleration over high latency media. In particular, aspects of this disclosure are directed to accelerating HTTP traffic in satellite communication systems. Further aspects of this disclosure pertain to communication terminals, such as satellite communication terminals and very small aperture terminals (VSAT).

BACKGROUND

The HTTP protocol may be considered part of the infrastructure in current information technology. Many applications may use this protocol for transferring many types of content (e.g. text, photos, audio objects, video objects, etc.) from servers to clients (e.g. browsers). As a result of its popularity, many methods were presented over the years for improving HTTP performance. These methods may be aimed at improving user experience and communication infrastructure usage efficiency.

One method for improving HTTP usage is to use caching, since in many cases the same content may be requested by many users (e.g. news pages, popular video objects, etc.). Upon first request, the required objects may be retrieved from a content server and stored in a cache (in addition to being forwarded to the requesting user). Thereafter, subsequent requests for the same objects may be served from the cache, i.e., the requested objects may be retrieved from the cache rather than from the content server. Use of the cache may reduce a response time for content retrieval and less bandwidth (or capacity) may be used between the requesting client and the content server.

In one refinement of said caching methods, multicasting may be used for increasing overall efficiency. Instead of, or in addition to, placing a single cache at a network center, a cache may be placed near each user. In addition, a server at a network center may be used for determining content of interest. Once content of interest is identified (either upon first request or even before it is requested for the first time), the server at the network center may retrieve this content from the content server and then send it using a multicast protocol to multiple caches of multiple users. Then, when a user requests this content, it may be retrieved from a local cache, i.e. with (almost) no latency and consuming minimal bandwidth of the communication infrastructure.

References to some of these caching methods may be found in U.S. Pat. No. 6,947,440, entitled "System and Method for Internet Page Acceleration Including Multicast Transmissions" to Chatterjee et al, the contents of which are incorporated by reference.

However, when trying to apply these caching solutions to a communication system, such as a satellite communication system, one skilled in the art may encounter several problems.

Satellite communication may be a preferred method for quickly deploying connectivity to a plurality of geographically dispersed sites. Thus, communication between users (clients) and servers may be carried over a satellite link, which may be considered as a resources-limited medium that may have undesired effects on data exchange and on user experience. For example, a satellite link may be shared between one or more users and may have limited capacity (bandwidth), hence capacity over the medium for any given user may be limited and its availability may change dynamically (for example, either due to variances in load and/or due to changes in overall capacity that may result from changes in link conditions, e.g. due to temporary rain fade in the link). In addition, a satellite link may introduce inherent latency in the excess of hundreds of milliseconds per direction, hence affecting user experience. Furthermore, a satellite link may be considered a non-reliable medium. In order to ensure integrity of the data being exchanged, reliability may need to be built into the data exchange protocol. Nevertheless, a satellite link may also have an advantage in such systems due to its ability to efficiently convey the same data to multiple users through multicast transmissions (i.e. data transmitted over the medium may be received by multiple users who choose to receive it).

In order to minimize response latency (i.e. improve user experience) as well as minimize traffic over the satellite between a client and a content server, a cache may be located as close as possible to the client requesting the content. In addition, in order for caching to be effective, the cache may need to be large enough, so that the hit ratio (i.e. the number of attempts for which the requested object may be stored in the cache compared to the total number of attempts to locate objects in the cache) may be sufficient for sustaining a quality user experience. For example, user experience may be poor if only, e.g., 50% of the objects can be found in a cache, but it may be quite good if, e.g., 90% of the objects may be found in the cache.

In case of a satellite communication system composed of a hub and a plurality of remote terminals, an approach as described above towards caching may require implementation of a cache at the remote terminal, e.g. by adding memory to the terminal's modem (or indoor unit (IDU)) and configuring the terminal to use it for caching information objects. However, increasing the amount of memory in a terminal may also increase the cost of the terminal. As the amount of memory available in a terminal's modem may be preconfigured and determined during the terminal's production (i.e. it may not be possible to add more memory to the terminal once the terminal is deployed), increasing the amount of memory per terminal during its manufacturing may result in higher terminal cost regardless of whether the excess memory is actually needed and/or used by the end user, or not.

Another method known in the art for increasing caching efficiency may be the use of multicast transmissions for distributing content of interest. It may be highly probable that certain information objects (e.g. news content, shared video clips, etc.) may interest many people hence these objects may be requested by more than one client. By multicasting such objects (either by unsolicited pushing of this content and/or following a first request for it) to a plurality of clients and by the clients storing these objects in local caches, the number of requests transmitted from these clients to content servers and the number of times that said objects may have to be transmitted to clients may be substantially reduced (i.e. as many of the requests may be fulfilled from the clients' local caches).

However, in case of a satellite communication system composed of a hub and a plurality of remote terminals, the population of terminals may not be homogenous, i.e. some of the terminals may include sufficient memory and processing power to support caching of many objects received though multicast transmission, while other terminals may have lower performance, i.e. they may not support caching and/or have lower processing power. Using state of the art multicast techniques as described above may overwhelm the lower performance terminals, which may become very busy in filtering a lot of information they have nothing to do with instead of processing traffic of interest.

Furthermore, current state of the art multicasting techniques were mostly presented prior to the introduction of Adaptive Coding and Modulation (ACM) techniques for satellite communication systems (e.g. the introduction of DVB-S2 (ETSI EN 302 307)). One purpose of ACM techniques may be to optimize channel efficiency by altering transmission characteristics (e.g. modulation and error correction coding) in accordance with capability of a receiver at a terminal to receive the transmission. However, when transmitting information in multicast, the transmission is destined to a group of terminals, hence determining which transmission characteristics to use may be quite difficult. Selecting the most robust transmission characteristics in order to maximize the probability of reception by all the potential receivers may be an inefficient solution, as it may significantly reduce the system throughput (i.e. since the most robust transmission characteristics may require the least reception capabilities but also allow transmission of the fewest information bits per each bandwidth unit).

Yet another problem with caching may be the response time when objects of interest are not stored in a cache. A method known in the art for reducing the total time it may take a client to retrieve such objects in such a scenario may be known as pre-fetching. For example, a client located at a remote terminal of a satellite communication system may issue a request for a web-page. Assuming the request might not be fulfilled from a local cache, the request may be forwarded over the satellite and via a hub of said system to a content server. The content server may reply to the request with a base object of the requested page, wherein the base object may include links to subsequent objects that may be embedded in the page (e.g. pictures, graphic elements, controls, etc.). If pre-fetching may be used in said satellite communication system, the hub may include an entity which may analyze the base object received from the content server and issue requests for the linked objects, even though the client has not yet requested these additional objects (i.e. since the client requested the page, it is highly probable that it may also request the other objects embedded in the page). When the additional objects are received from the content server, they may be transmitted to the remote terminal over the satellite.

However, even if a remote terminal has a cache, it may still send a request for the base object of the web-page, for example in order to refresh the page or if the base-object is not cacheable. In such cases, when the base-object is received at the terminal, the terminal may determine that at least some of the embedded objects may be stored in its cache and it may use the stored copies instead of fetching them over the satellite (i.e. thus reducing traffic over the satellite and provide better experience for a user). Nevertheless, said hub entity may still analyze the base page, pre-fetch all the linked objects, including those already stored in the terminal's cache, and transmit them over the satellite hence wasting valuable satellite link capacity.

Thus, when trying to apply caching solutions to a satellite communication system, several challenges may have to be met. As the medium may be quite expensive to lease from a satellite owner, one challenge may be to minimize the bandwidth required over the medium in both directions (i.e. from a remote terminal to a central site (inbound) as well as from the central site to the remote terminal (outbound)). Another challenge may be to mitigate the effects of the link latency and to minimize the interval between request and response (i.e. to improve user experience). However, since in many cases these first two challenges may be contradicting (i.e. improving user experience often requires more capacity over the satellite link), a third challenge may be to balance between the first two challenges. Yet a forth challenge may be related to service levels (sometimes referred to as service level agreement (SLA)), which a system operator may provide to users (e.g. data rates at which data is exchanged over the system). User SLA may have to be met (i.e. measured and enforced) at the user network interface (UNI, e.g. a LAN interface connecting a terminal and a user PC) regardless of any traffic optimizations on one hand (from which the system operator may benefit), or any deterioration in link conditions on the other hand, which may require additional bandwidth for meeting the SLA.

BRIEF SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some aspects of the disclosure in a simplified form as a prelude to the description below.

Aspects of the disclosure are directed to a satellite communication system. The system may comprise at least a hub, at least one terminal configured to include a cache for storing data objects, and any number of terminals not having a cache. The at least one terminal configured to include a cache may be configured to comprise a detachable micro-SD chip, which may be inserted to or removed from the terminal at any given time, including after the terminal is deployed. In some embodiments, said at least one terminal configured to include a cache may be configured to include a communication port for at least the purpose of interfacing a storage device that may be used as a cache.

Aspects of the disclosure are directed to preventing a prefetching of objects already stored in a cache at a remote terminal.

Aspects of the disclosure are directed to distributing content to groups of terminals. In some embodiments, one or more of these aspects may be applied to a hybrid (heterogeneous) network, wherein some of the remote terminals may include a cache while other terminals may not include a cache. In some embodiments, content may be distributed in a manner which may benefit terminals which may include a cache, while not affecting or minimally affecting the performance of terminals that may not include a cache.

Aspects of this disclosure are directed to distributing content through use of multicast to groups of terminals based on reception capabilities of each individual terminal. In some embodiments, link conditions of a requesting remote terminal, a probability that a requested object may be requested again prior to its expiry by another remote terminal having worse link conditions, a transmission channel congestion level, and/or an amount of overhead that may be associated with transmitting a particular object may be taken into consideration.

BRIEF DESCRIPTION OF THE DRAWINGS

Figure 1:
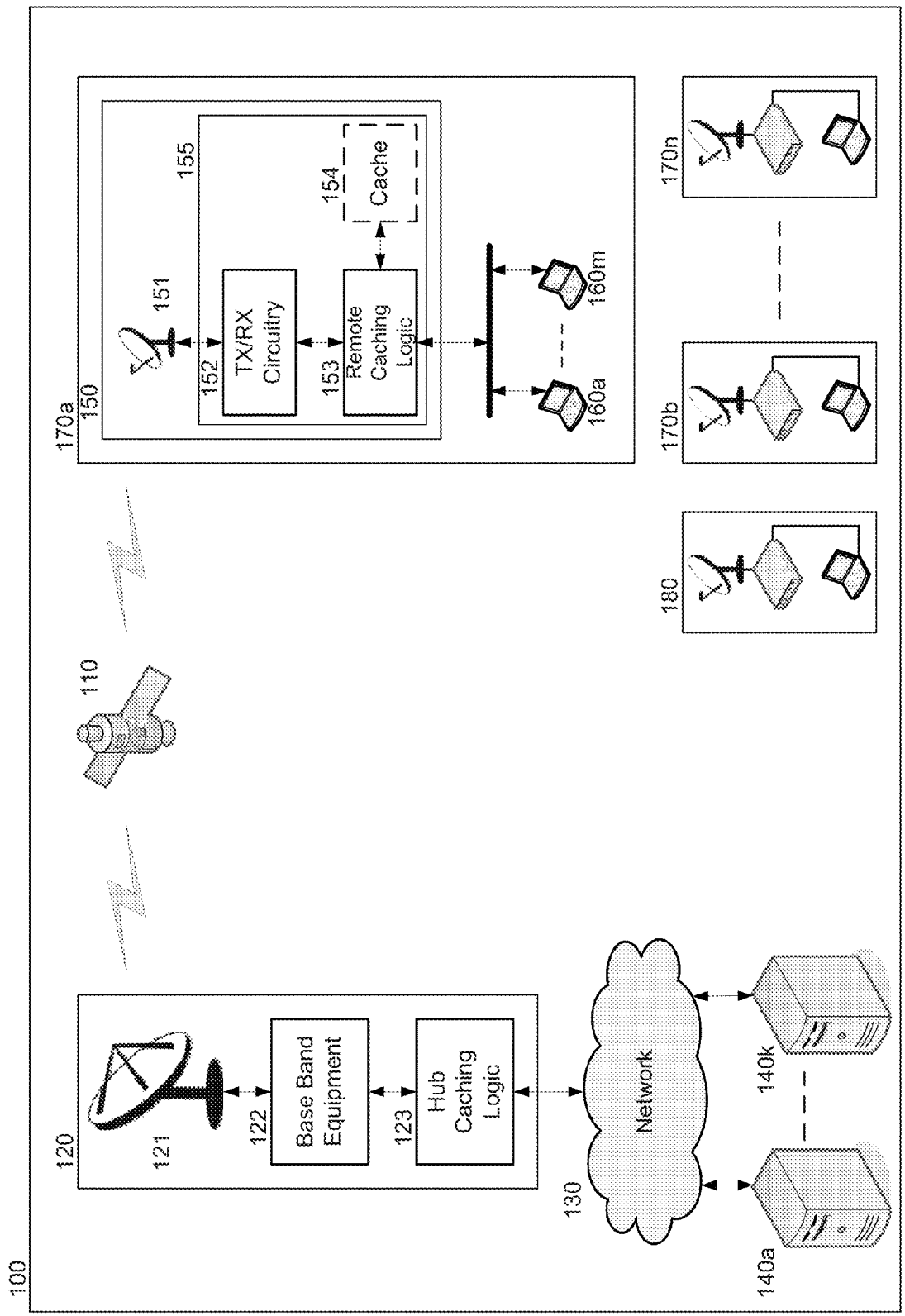

Having thus described aspects of the disclosure in general terms, reference will now be made to the accompanying drawings, which are not necessarily drawn to scale, and wherein:

FIG. 1 shows a satellite communication system in accordance with aspect of the disclosure.

Figure 2:
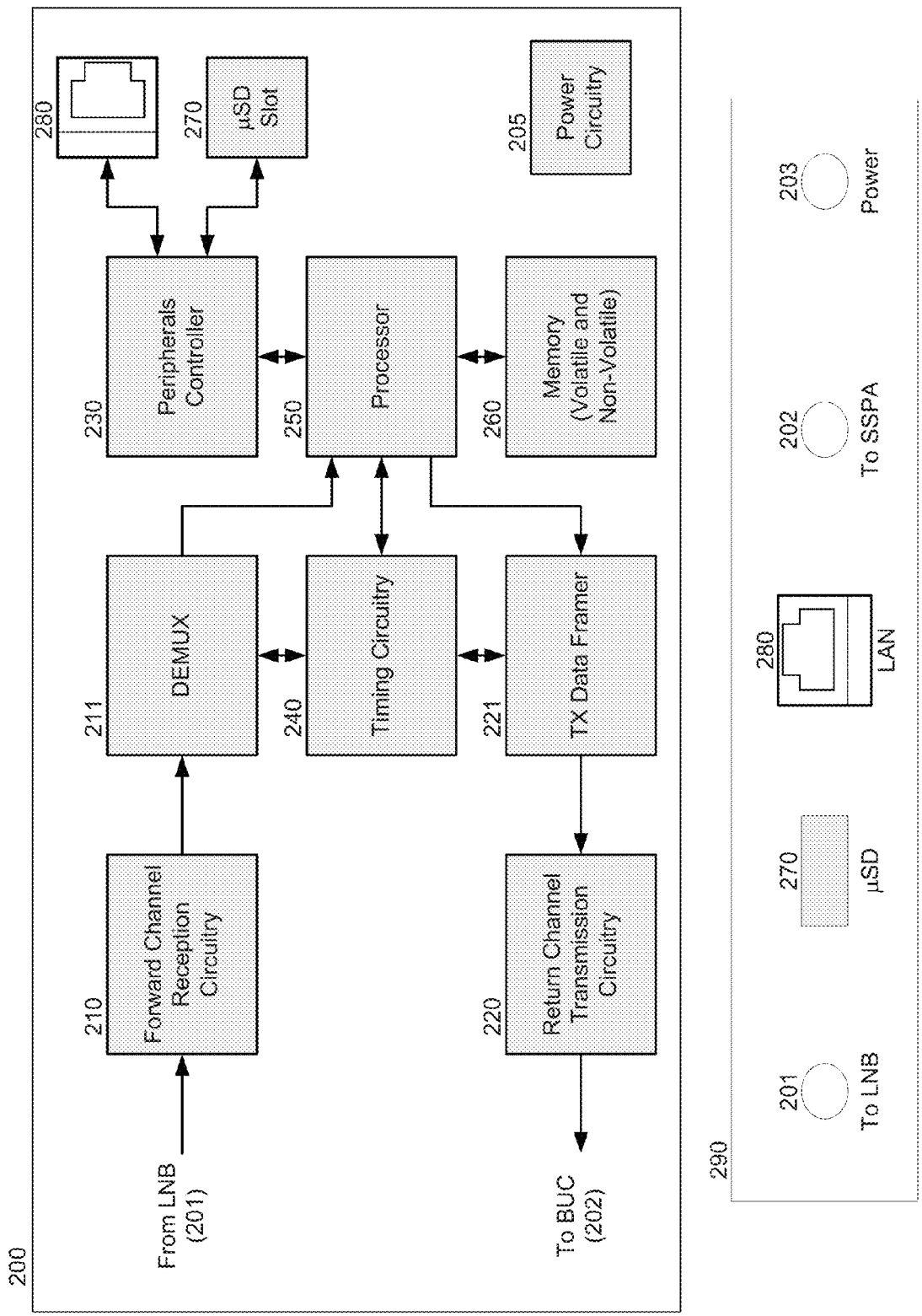

FIG. 2 shows a block diagram of a remote terminal and an illustration of a terminal modem panel in accordance with aspects of the disclosure.

Figure 3:
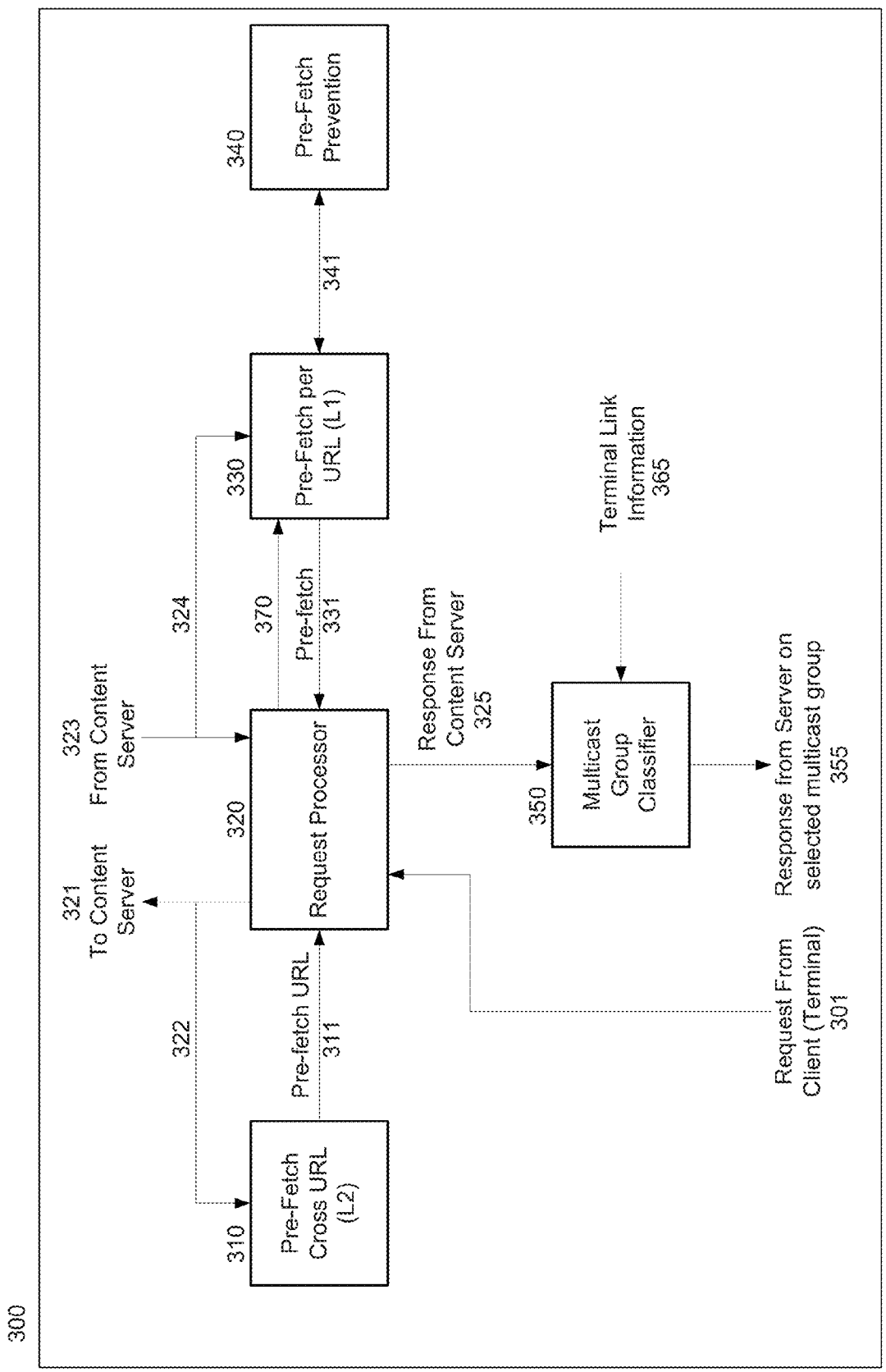

FIG. 3 shows a block diagram of hub caching logic in accordance with aspects of the disclosure.

Figure 4:
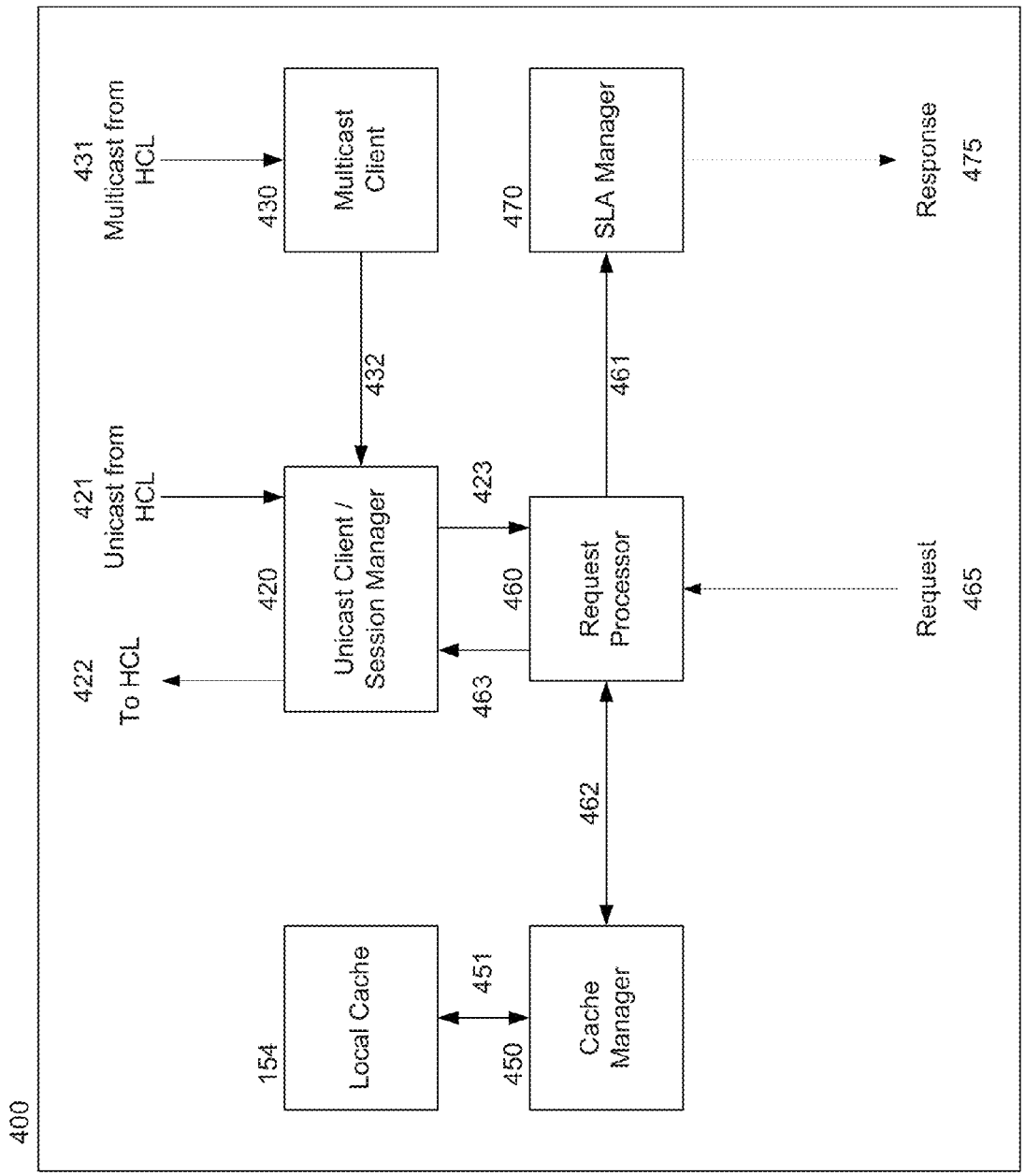

FIG. 4 shows a block diagram of remote caching logic coupled with a cache in accordance with aspects of the disclosure.

Figure 5:
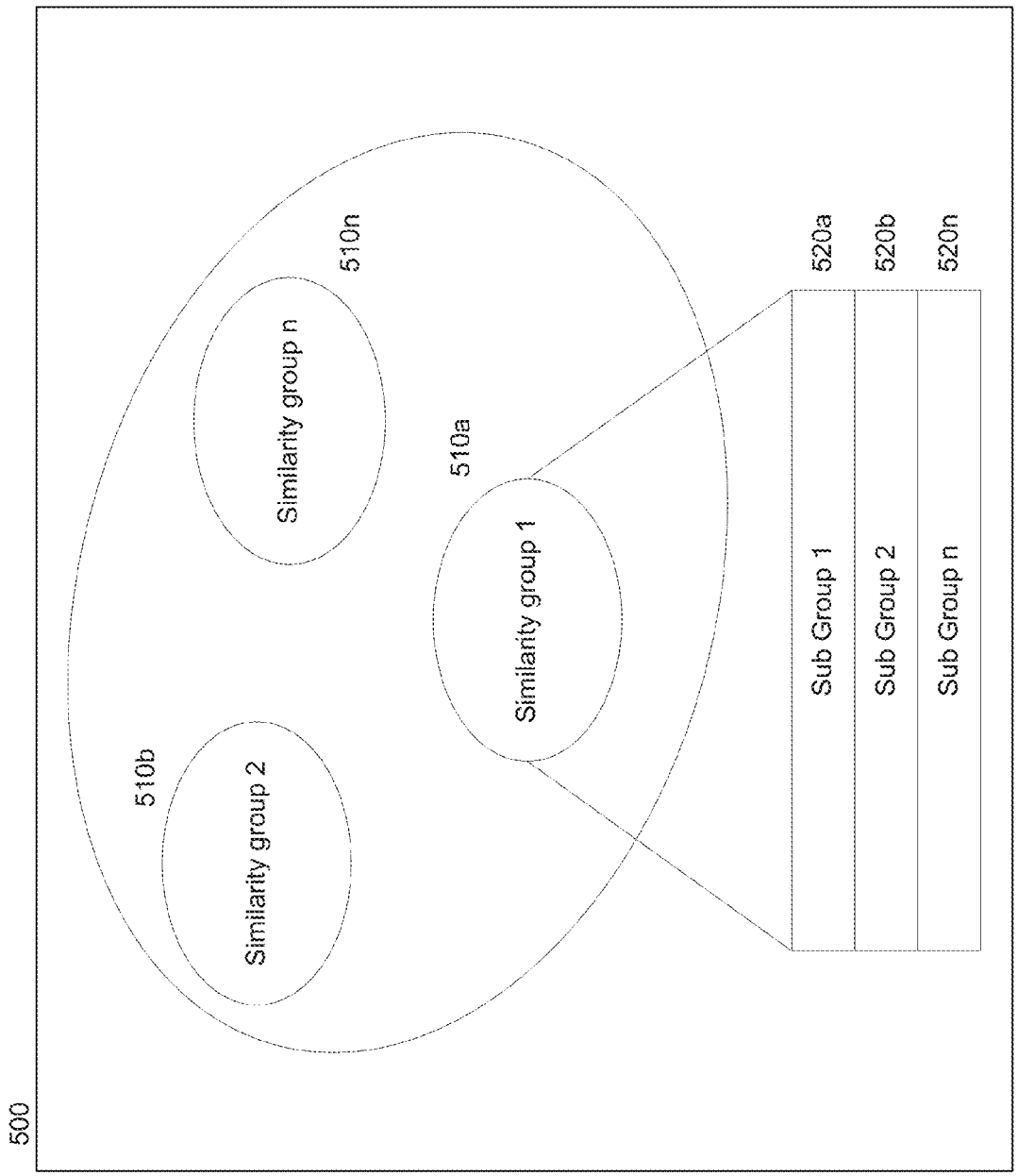

FIG. 5 shows a diagram of multicast groups and cluster groups in accordance with aspects of the disclosure

DETAILED DESCRIPTION

FIG. 1 shows a system 100 comprising a central hub (120) and plurality of geographically dispersed sites 170. A site 170 may include a satellite communication terminal 150, which may be configured to communicate with central hub 120 over a satellite 110. In addition, each terminal 150 may service one or more users 160 (e.g. personal computers), which may be connected to it (for example, using Ethernet LAN connectivity). In some embodiments, terminal 150 may be a very small aperture terminal (VSAT).

A user 160 of system 100 may access content of interest (e.g. files, HTML pages, or any other type of digitally stored data), which may be stored on one or more content servers 140, wherein access to content servers 140 may be via hub 120 and possibly also via a terrestrial network 130. User 160 may simultaneously generate one or more sessions, wherein one or more of the sessions may comprise an uploading (sending) and/or downloading (retrieving) of data to/from any one or more of content servers 140. In order to improve usage experience (i.e. expediting content-of-interest retrieval) for at least one user 160 connected to at least one terminal 150, terminal 150 may be configured to include a cache 154. It should be noted that while at least one terminal 150 may include a cache, one or more other terminals 150 in said system 100 may be configured to support a cache but may not actually include a cache at a given point in time (i.e. a cache may be added to a terminal 150 at a later point in time). Moreover, system 100 may also include one or more other terminals 180, which may be configured not to include any cache.

Further considering system 100, exchange of data within the system, i.e. between users 160 and content servers 140, may be request-response oriented. A user 160 located in a remote site 170 may send a request (i.e. via a terminal 150) for one or more objects (for example, the objects forming an HTML page the URL (Universal Resource Locator) for which may be included in the request). The request may be received by a content server 140 (i.e. via hub 120), which may then respond to the received request by sending the requested one or more objects, wherein said objects may considerably vary in size (e.g. from small objects of few tens of bytes (e.g. 64 bytes) to large objects of hundreds of kilobytes and more). While a typical request-response scenario may correspond to web browsing (e.g. using HTTP), system 100 may be configured to support any request-response protocol.

Again in reference to FIG. 1, terminal 150 may be configured to comprise an indoor unit 155 and an outdoor unit 151, wherein outdoor unit 151 may further comprise an antenna and any necessary outdoor electronics for transmitting information to and receiving information from the satellite, respectively (for example, a block up converter (BUC) and a low noise block (LNB) respectively—both not shown in the drawing). Indoor unit 155 may be further configured to include at least a cache 154 and a Remote Caching Logic (RCL) 153, wherein the RCL may be configured to use cache 154 in accordance to methods presented further herein. Indoor unit 155 may be configured to include transmit/receiver (TX/RX) circuitry 152 to facilitate an exchange (e.g., transmission and/or reception) of data or communications.

FIG. 2 shows a block diagram 200, which may correspond to indoor unit 155 of terminal 150 of FIG. 1. Indoor unit 155 may be configured to include forward channel reception circuitry 210, a demultiplexer 211 for at least the purpose of filtering received data of interest, return channel transmission circuitry 220, a transmission data framer 221, timing circuitry 240 for at least the purpose of controlling transmission timing using timing information that may be received from the hub, a processor 250 that may be coupled with non-removable memory 260, and a peripherals controller 230 for supporting interfaces towards the user, for example an Ethernet LAN interface 280. In some embodiments, said peripheral controller may be embedded into processor 250.

In some embodiments, indoor unit 155 may be configured to include micro-SD (Secure Digital) slot 270. Slot 270 may be configured for fitting a detachable non-volatile memory device. As shown in FIG. 2, slot 270 may be accessible from the exterior of the indoor unit (290), e.g. via its rear panel (though any other panel may be used for that purpose), hence said memory device may be inserted or removed from the terminal at any time, including after the terminal may have been deployed. In some embodiments, slot 270 may include an external protective cover (not shown), with or without a locking mechanism, which may cover this slot only.

Insertion or removal of said memory device may be done while indoor unit 155 may be coupled with outdoor unit 151 and/or without taking the indoor unit apart in any way (for example without removing any of its panels or covers, e.g. for gaining access to any of the indoor unit internal modules). In some embodiments, insertion and removal of said memory device may be supported while terminal 150 is operative, i.e. without powering off indoor unit 155.

Micro-SD may be a format for memory devices used in one or more embodiments of this disclosure. In some embodiments, indoor unit 155 may be configured to include a slot 270 configured for fitting memory devices of other formats, e.g., mini-SD, high-capacity SD, etc.

In some embodiments (not shown in FIG. 2), indoor unit 155 may be configured to include a communication port (for example, a Universal Serial Bus (USB) port). In some embodiments, indoor unit 155 may be configured to use a communication port for interfacing an external storage device and use it as cache 154.

In some embodiments, processor 250 of indoor unit 155 may be configured to determine whether a memory device is present in slot 270 (or connected via a communication port), wherein said determining may be performed at any of the events of powering up the indoor unit, resetting the indoor unit, and/or following insertion and/or removal of the memory device while the indoor unit is operative. If a memory device is present, processor 250 may be configured to use it as cache 154. Furthermore, wherein cache 154 is present, indoor unit 155 may be configured to support the remote cache logic 153 functionality either in software, or in hardware, or in any combination of software and hardware.

As previously described in reference to FIG. 1, system 100 may include at least one terminal 150 which may be configured to include a cache 154. In some embodiments, wherein cache 154 may be used to address at least the challenges previously described (i.e. minimizing bandwidth requirements, improving user experience, etc.), terminal 155 may include remote caching logic (RCL) 153 and hub 120 may include hub caching logic (HCL) 123, wherein both said caching logic elements may be configured as described herein.

FIG. 3 shows a block diagram 300, which may correspond to hub caching logic 123. Hub caching logic 123 may be configured to include a request processing (RP) module 320, a pre-fetch cross URL (PCU) module 310, a pre-fetch per URL (PPU) module 330, a pre-fetch prevention module 340, and a multicast group classifier (MGC) module 350.

Request processor (RP) module 320 may be configured to process requests for information objects (e.g. requests containing URLs) and responses that may include requested information objects, optionally on a per session basis as described herein.

RP 320 may be configured to receive one or more requests 301 from one or more terminals 150 configured to include remote caching logic 153. For each request 301 received, RP 320 may be further configured to analyze the request and to either generate and send a corresponding request or forward the received request (i.e. using proxy or proxy-less mode, respectively) to a content server (321). In addition to sending request 321 to a content server, RP 320 may be further configured to forward copy 322 of request 321 to pre-fetch cross URL (PCU) module 310.

PCU 310 may be configured to receive (copies 322 of) requests 321, wherein one or more requests may include at least one URL. For one or more of the (copy 322 of) requests 321 received, PCU 310 may be further configured to analyze the request while considering all other active requests (i.e. over all active sessions) and to determine or predict (e.g. based on stored history of requests) whether additional URLs may be further requested by one or more terminals 150 in subsequent sessions, i.e. outside the scope of retrieving objects associated with the one or more URLs included in the analyzed request. If PCU 310 determines that additional URLs may be requested, PCU 310 may be further configured to generate one or more requests 311 for said additional one or more URLs and to forward these requests to RP 320, wherein RP 320 may be configured to process a request 311 as described above, i.e. as it may process requests 301 (in particularly, pre-fetch of additional objects per URL may be done on a per session basis).

Furthermore, RP 320 may be configured to receive one or more responses 323 from one or more content servers, wherein response(s) 323 may correspond to one or more requests 321 previously sent by RP 320 to said content servers. For each response 323 received, RP 320 may be further configured to analyze the response and to either generate and send a corresponding response or forward the received response (i.e. using proxy or proxy-less mode, respectively) to multicast group classifier (MGC) 350 (325), which may be configured to associate response 325 with a multicast group prior to sending a response (355) towards the requesting remote caching logic 153 (325). In addition to sending response 325 to the requesting RCL 153, RP 320 may be further configured to forward a copy 324 of response 323 to pre-fetch per URL module 330.

As mentioned above, multicast group classifier (MGC) 350 may be configured to receive responses 325 from RP 320, associate one or more of responses 325 with a multicast group and then transmit the response on the selected multicast group (355) towards the requesting remote caching logic 153 (325) and towards all remotes 150 associated with the selected multicast group. In order to perform said association, MGC 350 may be configured to analyze URLs that may be requested by each terminal 150 (i.e. through its RCL 153) and to form groups of said terminals 150. For example, and in reference to FIG. 5, terminals 150 may be clustered into multicast groups 510 in accordance with their usage similarity, wherein remotes 150 that may tend to request one or more similar URLs (e.g. based on analyzing their requested URLs histories) may be associated with the same multicast group. In some embodiments, a remote 150 may be associated with more than one multicast groups.

Furthermore, MGC 350 may be configured to receive (either occasionally or periodically) information regarding terminals 150, wherein this information may include at least link condition information (365). In some embodiments, said information 365 may be received from hub's 120 base band equipment 122 (FIG. 1). Thus, for each multicast group 510, MGC 350 may be further configured to use received information 365 regarding each terminal 150 associated with said multicast group, for at least the purpose of determining one or more subgroups 520 within said multicast group and associating each terminal 150 associated with said multicast group with one of said subgroups. In some embodiments, a first subgroup 520a may be associated with weakest link conditions, while a last subgroup 520n may be associated with strongest link conditions. In some further embodiments, subgroups 520 may be predefined (i.e. per multicast group) and MGC 350 may be configured to use information 365 for associating each terminal 150 to a sub group 520 within each multicast group 510 said terminal 150 may be associated with.

As previously described, MGC 350 may be configured to associate each response 325 with a multicast group 510 and then transmit the response on the selected multicast group. MGC 350 may be further configured upon associating a response with a multicast group 510 to further associate each object in the response with a subgroup 520 within the selected multicast group 510. In some embodiments, MGC 350 may consider each object included in the response and determine a probability that the object will be requested by terminals other than terminal 150 which may have requested the object or for which the object may be destined to. Objects associated with low probability may be sent in accordance with transmission characteristics corresponding with subgroup 520n, e.g. using modulation and coding characteristics suitable for the strongest links Objects associated with high probability may be sent in accordance with transmission characteristics corresponding with subgroup 520a, e.g. using modulation and coding characteristics suitable for the weakest links, hence increasing the probability of this object to be received by at least most of the terminals 150 listening on the multicast group.

Again in reference to FIG. 3, as described above, pre-fetch per URL (PPU) module 330 may be configured to receive (copies 324 of) responses 323 that may be received from one or more content servers. Each (copy 324 of) response 323 may include one or more information objects, wherein any one of these objects may contain information regarding and/or pointers to additional objects. Therefore, for each (copy 324 of) response 323 received, PPU 330 may be further configured to analyze the response and to determine whether it includes information regarding and/or pointers to additional objects that may be further requested within the same session, i.e. in association with the same URL corresponding to the analyzed response. If PPU 330 determines that additional objects may be requested within the same session, PPU 330 may be further configured to generate one or more requests 331 for said additional objects and forward these requests to RP 320.

RP 320 may be configured to process requests 331 as described above, i.e. as it may process requests 301. Thus, requests 331 may trigger further responses from the content server, which may in turn include information regarding and/or pointers to yet additional objects associated with the same URL. In some embodiments, PPU 330 may be configured to request second level pointed object as well. In some embodiments, there may be no limit to the number of pointing levels through which PPU 330 may be configured to generate requests for.

FIG. 4 shows a block diagram 400, which may correspond to remote caching logic (RCL) 153. RCL 153 may be configured to include a request processor 460, a multicast client 430, a unicast client/session manager 420, a cache manager 450 configured to manage a local cache such as cache 154, and an SLA manager 470.

In some embodiments, cache 154 may be an integral part of remote 150 (as shown in FIG. 1) and cache manager 450 may be configured to store, remove and retrieve objects in or from cache 154 as applicable (451), as well as to manage the physical storage medium. In some embodiments, cache 154 may be based on a micro-SD memory device, as previously described. In some embodiments, other possibilities for realizing cache 154 may exist, either integrally with terminal 150 or as external additions to terminal 150.

Request processor (RP) 460 may be configured to receive requests 465, for example URL requests from an application layer and/or from a user (e.g. 160 in FIG. 1) connected to terminal 150, for example via a LAN interface, and to forward them to unicast client and session manager 420 (463), which in turn may be configured to at least forward the request to hub caching logic 123 (422). Furthermore, RP 460 may be configured to communicate with cache manager 450 (462) at least for the purpose of determining whether objects that may be associated with request 465 may be stored in cache 154. If objects associated with request 465 may be stored in cache 154, RP 460 may be configured retrieve them from cache 154 and to forward them to SLA manager 470 as soon as they may be sent to the requesting user (for example, it may be necessary to first receive web-page first object and send it to the requesting user prior to sending any objects that may be embedded in the page or otherwise linked to it).

Multicast client 430 may be configured to receive multicast responses 431 from hub caching logic 123 on one or more multicast streams associated with one or more multicast groups, to determine whether responses 431 may include objects of interest, and to forward said objects of interest (i.e. if included in responses 431) to unicast client/session manager 420 (432). Furthermore, multicast client 430 may be configured to determine to which one or more multicasts streams (multicast groups) to listen, wherein the number of streams determined may be lower or equal to a maximal number of multicast groups which multicast client 430 may be configured to determine from time to time. In some embodiments, multicast client 430 may determine the maximal number of multicast groups either periodically (i.e. at predefined intervals) or whenever a certain volume of information may be received (e.g. after receiving so many bytes since the last time this number has been calculated). Said determining of said maximal number of multicast groups may be based on several parameters, including (but not limited to) one or more of the size (i.e. the storage capacity) of local cache 154, performance characteristics of terminal 150 (e.g. total rate or volume of traffic which terminal 150 may process) and a maximal data rate that terminal 150 may be able to receive considering its satellite link conditions. For example, a first terminal 150 may have higher performance and/or relatively a large cache, while a second terminal 150 may have lower performance and/or a smaller cache than first terminal 150. In this example, first terminal 150 may listen on more multicast groups and/or store more objects in the local cache than second terminal 150.

Unicast client 420 may be further configured to receive unicast responses 421 from hub caching logic 123, as well as objects of interest received from multicast client 430, to merge the objects received via multicast into one or more unicast streams associated with one or more sessions and to forward the received objects (423) to RP 460.

Upon receiving objects received from hub caching logic (HCL) 123, RP 460 may be further configured to determine whether any of the objects received should be stored in cache 154 and if so determined to forward these objects to cache manager 450 (462). In addition, RP 460 may be configured to determine which of the received objects may be required for responding to request 465 and forward said objects (461) to the SLA manager 470.

SLA manager 470 may be configured to receive objects to be sent to a user (461), regardless of whether the objects where received from HCL 123 (either in unicast or multicast) or retrieved from local cache 154, and to forward them to the user (475) while enforcing a maximum information rate (MIR) between terminal 150 and the user. However, since objects retrieved from cache 154 may be available for sending in a significantly higher rate than the allowed MIR, SLA manager may be configured to limit the sending of objects to the user (475) in order to enforce said MIR.

In some embodiments, SLA manager may be configured to prioritize objects that may be received from HCL 123 over objects that may be retrieved from cache 154, at least for the purposes of not exceeding the enforced MIR and/or refraining from wasting bandwidth over the satellite link. For example, in some cases, SLA manager 470 may be forced to drop objects (e.g. due to lack of memory for storing them), hence it may be preferred that the objects dropped may be those retrieved from cache 154 and not objects received over the satellite link (especially non-cacheable objects that may be received in unicast).

One or more pre-fetching processes may rely on a certain degree of probability. As described above, PPU 330 may be configured to analyze at least a first object received from a content server in response to a first request for a URL, predict which additional objects may be further needed and/or eventually requested by RCL 153 in association with the same URL. Once the additional objects are received, RP 320 may send them towards the requesting remote caching logic 153, i.e. over the satellite link. However, maintaining said pre-fetching logic while a cache (e.g. cache 154) may be present at the requesting terminal (e.g. 150) and perhaps being managed by RCL 153 may result in bandwidth inefficiency. For example, one or more objects associated with a requested URL may be stored in said cache, hence pre-fetching the same objects at the hub and sending them to RCL 153 over the satellite link may nullify some or all of the bandwidth saving that may be obtained as a result form using a cache at the remote terminal.

Aspects of the disclosure are directed to preventing a prefetching of objects already stored in a cache at a remote terminal. In some embodiments, these aspects may be incorporated into a hub caching logic, as shown in FIG. 3, and/or in remote caching logic of FIG. 4.

Upon receiving a first request 301 for a URL (e.g. a webpage), RP 320, in addition to processing request 301 as previously described, may signal PPU 330 to generate a reference record corresponding to the requested URL (370). When one or more (copy 324 of) responses 323 containing one or more objects associated with the requested URL may be received (i.e. from a content server), PPU 330 may analyze the one or more objects received and determine additional one or more objects to be pre-fetched, as previously described. With each subsequent response received, PPU 330 may update the reference record previously generated and record at least a URL identifier corresponding to the requested URL and one or more indexes, wherein each index may correspond to one object of said additional objects that may be pre-fetched. PPU 330 may then forward the reference record to RP 320, which may be further configured to send the reference record together with responses 325 towards the requesting RCL 153.

Upon receiving one or more responses to said first request 301 for said URL (e.g. a web-page), and a reference record associated with the requested URL (e.g. based on said URL identifier included in said record), RCL 153 may be configured to store one or more received objects included in said one or more received responses and said reference record associated with said URL in cache 154.

Upon receiving a second request for the same URL (e.g. a web-page), RCL 153 may be configured to determine whether objects associated with the requested URL may be stored in cache 154. If objects associated with the requested URL may be stored in cache 154, RCL 153 may be configured to search the cache for objects associated with the requested URL in accordance with a reference record that may be stored in the cache and which may have been sent by HCL 123 the last time said URL was requested. RCL 153 may be further configured to then construct a second request 301 and send it to HCL 123, wherein second request 301 may include for each object found in the cache at least its index number and its last modification date (and possibly time as well). In some embodiments, the volume of traffic from terminal 150 to hub 120 may be reduced compared to requesting each object separately, for example using a separate request containing an object's full name, which may be significantly longer than an index, as previously suggested. Furthermore, for at least the purpose of achieving higher bandwidth efficiency, in some embodiments, a common last modification date (and possibly time as well) field may be included in said second request 301 (e.g. in a header or in any other common part of the request message), wherein additional modification date (and possibly time as well) information may be included in second request 301 only for newer objects, i.e. objects having modification dates (and possibly times as well) later than the common modification date (and possibly time as well).

Upon receiving said second request 301, RP 320 may be configured to process second request 301 as previously described, i.e. request the relevant URL (e.g. a web-page) from a content server. However, upon receiving a response from the content server, PPU 330 may analyze it as previously described and compare the analysis with the previously stored reference record associated with the same URL. If the requested URL (e.g. a web-page) may not have been modified (e.g. no objects may have been deleted or added) since the last modification date indicated in said second request 301, PPU 330 may be configured to pre-fetch some or all additional objects associated with the requested URL from the content server but send to requesting RCL 153 only those objects which may have been modified. Objects that were not modified may not be sent to RCL 153, but the one or more responses sent to requesting RCL 153 may include an indication to that effect, for example as part of the reference record previously described.

However, if the requested URL (e.g. a web-page) may have been modified (e.g. at least one object may have been added or deleted) since the last modification date indicated in said second request 301, PPU 330 may be configured to analyze the URL again for pre-fetching and issue requests to RP 320 for all additional objects associated with the URL, as previously described. Once one or more responses from the content server may be received, PPU 330 may analyze them. PPU 330 may maintain the same indexes previously given to objects which may have remained in the URL and assign new indexes to objects that may have been added to the URL. However, if the number of new objects in said URL exceeds a certain predefined threshold, PPU 330 may be configured to reset all indexes associated with the URL and to rebuild the reference record from scratch. In any case where indexes were changed (either added or completely reset), a response sent to RCL 153 may include the new reference record, e.g. as indication that an index synchronization should take place.

In yet another aspect of the disclosure, another technique for preventing prefetching of objects already stored in a cache at a remote terminal is presented. In some embodiments, this method may be incorporated into a hub caching logic, as shown in FIG. 3, and/or in remote caching logic of FIG. 4.

Upon receiving a first request for a URL (e.g. a web-page), RCL 153 may be configured to determine whether the URL is stored in cache 154. If said URL is not stored in cache 154, RCL 153 may be configured to send a request for said URL to HCL 123 (e.g. over the satellite link), which in turn may forward it to a content server (321), as previously described.

Upon receiving a response from the content server (323, 324), PPU 330 may be configured to analyze the response, generate a reference record that may contain one or more references to one or more objects that may be pre-fetched, and send said reference record to RP 320, which may be configured to forward it to RCL 153 together with said received response. In some embodiments, PPU 330 may be further configured to determine whether sufficient storage capacity may be available in a local storage for at least the purpose of storing one or more of the objects referenced in said reference record. If sufficient storage capacity may be available, then at least for the purpose of reducing overall latency in retrieving the entire URL (e.g. web-page), PPU 330 may be configured to request one or more of said referenced objects (i.e. as previously described) and upon receiving said one or more objects from the content server to store said one or more objects in said local storage until further information may be received from RCL 153.

Upon receiving said reference record and said response from HCL 123, RCL 153 may be configured to determine whether any one or more of the objects referenced in said record may be stored in cache 154. RCL 153 may be further configured to return said reference record back to HCL 123, wherein the returned record may include a last modification date information for each referenced object that may be stored in cache 154 (i.e. indicating no last modification date for a referenced object may be interpreted by HCL 123 as an indication that the object may not be available to RCL 153 from cache 154).

Upon receiving said modified reference record, RP 320 may be configured to forward it to PPU 330, which may be further configured to determine those objects associated with the requested URL that may have to be sent to RCL 153, i.e. objects which may be either not stored in cache 154, or may have been refreshed since the last modification date indicated by RCL 153 in said modified reference record. Consequently HCL 123 may send a response to RCL 153, wherein the response may include the objects determined by PPU 330 as being mandatory for sending, as well as updated last modification date information for each object that may not be sent to RCL 153, e.g. due to RCL 153 having a valid copy of it in cache 154.

Upon receiving the response, RCL 153 may be configured to store the objects received in full in cache 154. In addition, RCL 153 may be configured to update (i.e. in cache 154) the last modification date of any object already stored in cache 154 for which an updated last modification date information may have been received. Finally, RCL 153 may be configured to mark all said objects (whether received in full or already existed in cache 154) as available for the user, once requested.

As previously described, multicast may be used to send objects to be stored in local caches (e.g. like cache 154) of terminals 150. However, the satellite communication system shown in FIG. 1 may also include terminals which may not include a cache. For example, terminals 180 might not be configured to include a cache. In another example, any of terminals 170b to 170n may be able to support a cache but a cache storage media might not be present in said terminals.

As previously described the interaction between an RCL 153 and an HCL 123 may be request-response oriented and in order for a terminal containing a cache to benefit from requests made by other terminals (including those terminals not including a cache), said responses may be transmitted over multicast streams, which terminals lacking a cache (which in addition may also be of low performance) may also receive. Thus, each terminal lacking a cache may also be required to filter this multicast traffic and determine for each received object whether this object may be relevant to it or not.

In yet another aspect of the disclosure, a technique for multicasting content in a manner which may benefit terminals which may include a cache, while not affecting or minimally affecting the performance of terminals that may not include a cache, is presented.

Objects may be sent from HCL 123 to all terminals as native multicast objects, wherein each object may include its own headers and wherein these headers may not necessarily correspond to any TCP (Transmission Control Protocol) packets or any other packets in which the object may have been received from the content server. In addition, at hub 120, a terminal identifier corresponding to a terminal that may requested the object, may be added at a constant offset from the MAC address field included in said headers (or at a constant offset from the beginning of the multicast frame).

A terminal that may not include a cache may be configured to maintain the common practice of filtering multicast streams in accordance to a MAC address field included in the multicast frame. However, said terminal may be further configured to apply a second filter tuned for locating a terminal identifier included at said constant offset from the MAC address field (or from the beginning of the multicast frame). In some embodiments, both filtering may be performed in hardware hence no processing power by the terminal's main processor may be required for this filtering and the second filter may have no effect or very small effect on the terminal's performance.

Thus, if a multicast frame may be identified as related to a multicast group of the caching mechanism, the terminal may be configured to determine a match for the second filter using its own terminal identifier. If the second filter matches, the terminal may receive the frame and extract the object, which may be intended for it. However, if the second filter does not match, the terminal may be configured to discard the frame and the object included in it without any further burden on its resources.

In some embodiments, the multicast frames described above may further include sequence numbers and error detection and/or correction coding (e.g. CRC) for at least the purposes of overcoming miss orders and allowing receiving terminals to request retransmissions, i.e. if an error may be detected in an object based on said error detection code. A terminal having no cache may be allowed to always request retransmissions. On the other hand, a terminal having a cache, which may be receiving an object in multicast, may be allowed to request retransmission only if it may have retransmission request rights that may be granted by a multicast server. In some embodiments, only terminals that may have requested the object for which a retransmission may be required may be granted retransmission requests rights. In some embodiments, the frame size (i.e. fragment size) may be selected in a manner which minimizes the probability for errors below a practical limit, for at least the purpose of minimizing the number of retransmissions required.

By its nature, multicast may be unreliable. Although reliable multicast methods, apparatuses, and systems may exist in the literature, they may not be adequate for satellite links and for bandwidth saving. Assuming that suitable transmission characteristics, for example a modulation and coding combination (MODCOD), corresponding to the link conditions of a receiving terminal, may be used for any terminal on a per terminal basis, then the issue of the satellite link reliability may be resolved and the question of multicast reliability over a satellite link may be reduced to the question of selecting appropriate transmission characteristics (e.g. a MODCOD) for the multicast transmission. While a conservative approach may be to use (most) robust transmission characteristics to ensure that all terminals in the system may be able to receive the multicast transmission, this approach may fail to obtain the very purpose of using multicast in the current context as it wastes bandwidth (i.e. due to the fact that robust transmission characteristics (e.g. low order modulations, strong forward error correction codes) may often be characterized with low number of user information bits per bandwidth unit). For example, a first terminal that may be able to receive an efficient transmission may request an object, wherein the requested object may eventually be transmitted to the terminal over multicast using the most robust transmission characteristics. Thus, more bandwidth than may have been actually needed was consumed, as there may be no guarantee that any other terminal may request this object prior to its modification by the content server.

In a further aspect of this disclosure, a technique of distributing content through use of multicast to groups of terminals based on reception capabilities of each individual terminal is presented. In some embodiments, this technique may be used in satellite systems having an adaptive transmission channel (for example in accordance to DVB-S2 ACM) at least from the hub to the terminals.

Hub 120 in general or HCL 123 and/or MGC 350 in particular may be configured to consider several parameters upon determining and/or selecting transmission characteristics (e.g. MODCOD) for a multicast transmission. One parameter that may be considered may be the requesting terminal's reception capability. Since the requesting terminal (e.g. terminal 150) may be the only terminal for which it may be certain that the requested object may be used, and since retransmission may have a significant cost (e.g. both in bandwidth and in latency), a multicast transmission may be sent using transmission characteristics that may be at least as robust as the transmission characteristics required for the requesting terminal to receive the transmission. In some embodiments, the requesting terminal's identifier and its reception capabilities may be provided to MGC 350, as previously described and as shown in FIG. 3.

Another parameter that may be considered upon determining and/or selecting transmission characteristics (e.g. MOD-COD) for a multicast transmission may be the probability that other one or more terminals, which may require more robust transmission characteristics than the requesting terminal, may request the same object prior to the expiring of the object. As previously described, information regarding an object (or a URL) popularity may be stored either in the multicast groups which MGC 350 may be configured to create and maintain, and/or in PCU 310, which may be configured to store history of requested objects (or URLs) for at least the purpose of determining or predicting further requests following a request of a given object (or URL). Though a popularity index for each object may be maintained, in some more practical embodiments the popularity of only a number (e.g. predefined or a system configurable parameter) of leading objects may be tracked. For at least the purpose of popularity cost calculations (as shown herein) objects that may not be tracked for popularity may be automatically assigned a zero popularity index.

Furthermore, a new object may be introduced into a popularity table through counting the number of requests for said new object during a predefined period of time, e.g. starting from the time of the first request for said new object. In some embodiments, an object that may be requested only once during said time window (either including the request that triggered the opening of the time window, or excluding it) may not be introduced into the popularity table. On the other hand, an object that may be requested more than once during the said time window may be introduced into the popularity table. In some further embodiments, one or more objects may be manually introduced into the popularity table.

Another parameter that may be considered upon determining and/or selecting transmission characteristics (e.g. MOD-COD) for a multicast transmission may be the forward link congestion level (e.g. the congestion level on the forward channel over which traffic may be sent from hub 120 to all terminals). At times where the link may be uncongested (for example, during off-peak hours), then there may be no real cost associated with transmitting the multicast traffic using more robust transmission characteristics (e.g. MODCOD), as there may be sufficient, otherwise unutilized bandwidth for supporting the more robust transmission. In some embodiments, such times where the link may be uncongested may be used for "pushing" traffic using robust transmission characteristics. Such "pushing" (for example of popular objects) may be considered an efficient usage of the bandwidth, as it may prevent future retransmission requests for the same objects.

Yet another parameter that may be considered upon determining and/or selecting transmission characteristics (e.g. MODCOD) for a multicast transmission may be the cost of retransmission, which in turn may depend on a retransmission fragment size.

The above described parameters may be combined to construct a cost function for selecting (more robust) transmission characteristics (e.g. MODCOD i) instead of transmission characteristics that may be associated with the requesting terminal (e.g. MODCOD j).

The cost due to satellite link congestion may be calculated as follows:

$$\text{Congestion Cost} = (BW_i - BW_j) - (BW_A - BW_S)$$

Wherein $BW_i$ and $BW_j$ may represent the bandwidth that may be consumed when using the more robust transmission characteristics (e.g. MODCOD i) and the more efficient transmission characteristics (e.g. MODCOD j) respectively, $BW_A$ may represent the currently available bandwidth, and $BW_S$ may represent spare bandwidth which may be reserved for any new traffic that may have to be transmitted during the decision period.

The cost due to probability may be measured in accordance to popularity. For each object, hit information may be collected (for example at HCL 123). Then the number of requests expected for the object, should the multicast transmission carrying this object may not be received by any terminal, may be calculated as the number of hits per time unit (e.g. an hour) multiplied by the object's expiration span in same time units (e.g. an hour). In addition, the cost for transmitting an object using more robust transmission characteristics (e.g. MODCOD i) may be measured and then calculated as the number of terminals that may receive the object if transmitted using more robust transmission characteristics (e.g. MODCOD i) minus the number of terminals that may receive the object if transmitted using more efficient transmission characteristics (e.g. MODCOD j), divided by the total number of terminal that may be a configured to receive the multicast transmission.

Thus, the cost due to probability, or the popularity cost, may be calculated as follows:

$$\text{Popularity Cost} = \text{Hit} * T_E * (NT_i - NT_j)/(NT_m) * SB/t$$

Wherein Hit may represent be the number of hits per time unit, $T_E$ may represent the object expiration time using the same time units that may be used for Hit, $NT_i$ and $NT_j$ may represent the number of terminals that may receive the object if sent using the more robust and the more efficient transmission characteristics (e.g. MODCOD i and MODCOD j) respectively, $NT_m$ may represent the total number of terminals configured to receive the multicast transmission, SB may represent the object size in bits and t may represent a typical object transfer time.

Thus, a total cost for selecting (more robust) transmission characteristics (e.g. MODCOD i) instead of transmission characteristics that may be associated with the requesting terminal (e.g. MODCOD j) may be calculated as follows:

$$\text{Total Cost} = \text{Congestion Cost} + \alpha * \text{Popularity Cost}$$

Wherein $\alpha$ may be a weight parameter, which may be used for at least the purpose of controlling and/or adjusting the performance of the algorithm. Thus, an object may be multicast using more robust transmission characteristics (e.g. MODCOD i) instead of transmission characteristics that may be associated with the requesting terminal (e.g. MODCOD j) if the total cost may be lower than a threshold cost. In some embodiments the threshold cost may be set to zero, i.e. multicast may be transmitted using more robust transmission characteristics instead of transmission characteristics that may be associated with the requesting terminal only if there is no real additional cost associated with such selection.

Various aspects of the disclosure may be embodied as one or more methods, systems, apparatuses (e.g., components of a satellite communication network), and/or computer program products. Accordingly, those aspects may take the form of an entirely hardware embodiment, an entirely software embodiment, an entirely firmware embodiment, or an embodiment combining firmware, software, and/or hardware aspects. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In some embodiments, one or more computer readable media storing instructions may be used. The instructions, when executed, may cause one or more apparatuses to perform one or more acts described herein. The one or more computer readable media may comprise transitory and/or non-transitory media. In addition, various signals representing data or events as described herein may be transferred between a source and a destination in the form of electromagnetic waves traveling through signal-conducting media such as metal wires, optical fibers, and/or wireless transmission media (e.g., air and/or space).

Modifications may be made to the various embodiments described herein by those skilled in the art. For example, each of the elements of the aforementioned embodiments may be utilized alone or in combination or sub-combination with elements of the other embodiments. It will also be appreciated and understood that modifications may be made without departing from the true spirit and scope of the present disclosure. The description is thus to be regarded as illustrative instead of restrictive on the present disclosure.

What is claimed is:

1. A method comprising:
receiving, at a terminal of a satellite communication system, a first request from a user device coupled to the terminal;
forwarding the first request to a hub included in the satellite communication system;
determining that a first object associated with the first request is stored in a cache that is detachably inserted into the terminal;
retrieving the first object from the cache;
receiving, at the terminal and over a satellite link, any of a unicast transmission and a multicast transmission each comprising one or more objects associated with the first request, wherein receiving the multicast transmission comprises:
  selecting one or more multicast streams associated with one or more multicast groups, wherein a number of the one or more selected multicast streams is less than or equal to a predetermined number which is determined based on any of a storage capacity of the terminal's cache, a rate of traffic the terminal is configured to process, a volume of traffic the terminal is configured to process, and a rate of traffic the terminal is configured to receive considering its satellite link conditions; and
  listening to the one or more selected multicast streams to receive the multicast transmission;
storing at least one object of the one or more objects received over the satellite link in the cache; and
sending the first object and the one or more objects received over the satellite link to the user device.

2. The method of claim 1, wherein storing the at least one object of the one or more objects received over the satellite link in the cache comprises:
determining whether the at least one object is cacheable; and
storing the at least one object in the cache in response to determining that the at least one object is cacheable.

3. The method of claim 1,
wherein sending the first object and the one or more objects associated with the first request to the user device comprises sending the first object and the one or more objects while enforcing a maximum information rate between the terminal and the user device.

4. The method of claim 1, further comprising:
receiving one or more multicast responses associated with the one or more selected multicast streams;
determining for each of the one or more multicast responses whether it comprises an object of interest; and
merging the object of interest with any objects received from one or more unicast streams.

5. The method of claim 1, further comprising:
determining whether the cache is present in a slot of the terminal,
wherein storing the at least one object of the one or more objects received over the satellite link in the cache is responsive to determining that the cache is present in the slot of the terminal.

6. The method of claim 1, wherein receiving the first request from the user device comprises receiving a first uniform resource locator (URL) requested by the user device.

7. The method of claim 6, further comprising:
receiving, at the terminal and over the satellite link, a reference record corresponding to the first URL, wherein the reference record includes at least a URL identifier corresponding to the first URL and an index for at least one object of the one or more objects received over the satellite link and associated with the first request; and
storing the reference record in the cache.

8. The method of claim 7, further comprising:
receiving, at the terminal, a second request from a user device coupled to the terminal, wherein the second request comprises the first URL;
searching the cache for objects associated with the first URL in accordance with the reference record stored in the cache; and
constructing a request for the first URL and sending it to the hub, wherein the request includes at least a last modification time for at least one object associated with the first URL found in the cache.

9. A method comprising:
receiving, at a terminal of a satellite communication system, a first request from a user device coupled to the terminal;
forwarding the first request to a hub included in the satellite communication system;
determining that a first object associated with the first request is stored in a cache that is detachably inserted into the terminal;
retrieving the first object from the cache;
receiving, at the terminal and over a satellite link, any of a unicast transmission and a multicast transmission each comprising one or more objects associated with the first request;
storing at least one object of the one or more objects received over the satellite link in the cache; and
sending the first object and the one or more objects received over the satellite link to the user device, while enforcing a maximum information rate between the terminal and the user device, wherein the sending comprises:
  assigning a priority level to the first object and to the one or more objects received over the satellite link, wherein the priority level assigned to the one or more objects received over the satellite link is higher than the priority level assigned to the first object retrieved from the cache;
  determining whether to drop any objects to enforce the maximum information rate; and dropping lower priority objects before higher priority objects to enforce the maximum information rate.

10. The method of claim 9, wherein the priority level assigned to non-cacheable objects received over the satellite link is higher than the priority level assigned to cacheable objects received over the satellite link.

11. The method of claim 9, wherein storing the at least one object of the one or more objects received over the satellite link in the cache comprises:
determining whether the at least one object is cacheable; and
storing the at least one object in the cache in response to determining that the at least one object is cacheable.

12. The method of claim 9, further comprising:
determining whether the cache is present in a slot of the terminal, wherein storing the at least one object of the one or more objects received over the satellite link in the cache is responsive to determining that the cache is present in the slot of the terminal.

13. A method comprising:
receiving, at a terminal of a satellite communication system, a first request from a user device coupled to the terminal;
forwarding the first request to a hub included in the satellite communication system;
determining that a first object associated with the first request is stored in a cache that is detachably inserted into the terminal;
retrieving the first object from the cache;
receiving, at the terminal and over a satellite link, any of a unicast transmission and a multicast transmission each comprising one or more objects associated with the first request;
storing at least one object of the one or more objects received over the satellite link in the cache;
sending the first object and the one or more objects received over the satellite link to the user device;
determining whether the cache is present in a slot of the terminal;
receiving a multicast frame related to a multicast group the terminal belongs to;
in response to determining that the cache is absent from the slot of the terminal, determining whether the multicast frame includes at least one object requested by the terminal; and
extracting the at least one object from the multicast frame if the at least one object from the multicast frame is requested by the terminal.

14. The method of claim 13, wherein receiving the multicast transmission comprises:
selecting one or more multicast streams associated with one or more multicast groups, wherein a number of the one or more selected multicast streams is less than or equal to a predetermined number which is determined based on at least one of a storage capacity of the cache, a performance characteristic of the terminal, or a maximal data rate of the terminal; and
listening to the one or more selected multicast streams to receive the multicast transmission.

15. The method of claim 13, further comprising applying a filter to locate a terminal identifier at a predetermined offset from a media access control (MAC) address field of the multicast frame.

16. A terminal, comprising:
an indoor unit having a slot configured to receive a detachable cache; and
terminal caching logic configured to:
receive a first request from a user device coupled to the terminal;
forward the first request to a hub;
determine that a first object associated with the first request is stored in the detachable cache;
retrieve the first object from the detachable cache;
receive, over a satellite link, any of a unicast transmission and a multicast transmission each comprising one or more objects associated with the first request, wherein receiving the multicast transmission comprises:
selecting one or more multicast streams associated with one or more multicast groups, wherein a number of the one or more selected multicast streams is less than or equal to a predetermined number which is determined based on any of a storage capacity of the terminal's cache, a rate of traffic the terminal is configured to process, a volume of traffic the terminal is configured to process, and a rate of traffic the terminal is configured to receive considering its satellite link conditions; and
listening to the one or more selected multicast streams to receive the multicast transmission;
store at least one object of the one or more objects received over the satellite link in the detachable cache; and
send the first object and the one or more objects received over the satellite link to the user device.

17. The terminal of claim 16, wherein the terminal caching logic is further configured to:
determine whether the detachable cache is present in the slot,
wherein storing the at least one object of the one or more objects received over the satellite link in the detachable cache is responsive to determining that the detachable cache is present in the slot.

18. The terminal of claim 16, wherein the terminal caching logic is further configured to:
receive one or more multicast responses associated with the one or more selected multicast streams;
determine for each of the one or more multicast responses whether it comprises an object of interest; and
merge the object of interest with any objects received from one or more unicast streams.

19. The terminal of claim 16, wherein the slot is accessible from an exterior of the indoor unit and the indoor unit is configured to allow the detachable cache to be inserted or removed from the slot without taking the indoor unit apart or removing any panel or cover of the indoor unit.

20. The terminal of claim 16, wherein the indoor unit and the terminal caching logic allow the detachable cache to be inserted into or removed from the slot while the terminal is operative.

* * * * *